United States Patent [19]

Andernach et al.

[11] Patent Number: 4,714,920

[45] Date of Patent: Dec. 22, 1987

[54] METHOD FOR REPRESENTING THREE DIMENSIONAL STRUCTURES

[75] Inventors: Dieterich Andernach, Seebruck; Manfred Wurm, Zorneding, both of Fed. Rep. of Germany

[73] Assignee: Dr. Johannes Heidenhain GmbH, Traunreut, Fed. Rep. of Germany

[21] Appl. No.: 632,407

[22] Filed: Jul. 19, 1984

[30] Foreign Application Priority Data

Jul. 27, 1983 [DE] Fed. Rep. of Germany ....... 3327117

[51] Int. Cl.$^4$ .............................................. G09G 1/16
[52] U.S. Cl. ................................... 340/747; 340/723; 340/734; 364/474
[58] Field of Search ............... 340/729, 723, 724, 725, 340/747, 734, 709; 364/491, 512, 474, 171, 168, 170

[56] References Cited

U.S. PATENT DOCUMENTS 3,213,477 10/1965 Burrows et al. ............... 340/729
4,489,522 12/1984 Henseleit et al. ............... 364/171
4,521,860 6/1985 Kanematsu et al. ............. 364/474

OTHER PUBLICATIONS

Brochure entitled 4-Achsen-Bildschirm-Bahnsteuerung MAHO CNC 433 of Werkzeugmaschinenbau Babel & Co.
Bochure entitled Mazatrol T-1, of Yamazaki Machinery Works, Ltd., No. ALTR 81-8 10000.
Article entitled NC-Technik und Werkstattorganisation of Dipl.-Ing. H. Hammer, pp. 27-38 from Metallbearbeitung, 10/80.

Primary Examiner—Marshall M. Curtis
Assistant Examiner—Mahmoud Fatahi-Jar
Attorney, Agent, or Firm—Willian Brinks Olds Hofer Gilson & Lione Ltd.

[57] ABSTRACT

A process for representing on a picture screen of a numerical control system a simulated workpiece. The workpiece is represented in several viewing planes with shaded surfaces. The viewing planes and the associated shadings are hierarchically ordered, which is achieved by synchronized shading of different density. A tool is simulated by a silhouette, which presents the shading of the momentary viewing or processing plane which is being worked. In the movement of the shaded silhouette along with the programmed tool path, higher lying viewing planes are erased (or etched) and equally high or lower lying viewing planes are not affected.

16 Claims, 6 Drawing Figures

METHOD FOR REPRESENTING THREE DIMENSIONAL STRUCTURES

BACKGROUND OF THE INVENTION

This invention relates to a method for representing in two spatial dimensions a three dimensional surface which comprises a plurality of viewing planes spaced from one another along a viewing direction. Document No. T120,473, previously filed in the U.S. Patent and Trademark Office Disclosure Program on Sept. 12, 1983, relates to this invention.

Various methods for representing a workpiece are known which are more or less well suited to assist a user of a numerically controlled machine tool in programming operations. For example, the brochure identified as "ALTR 81-8 10000" of the firm of Yamazaki Machinery Works, Ltd., Japan, describes a control system identified as Mazatrol T-1. In this system the input program is displayed on a picture screen in the form of a set of tool path contours. This approach to workpiece representation can be confusing, for a tool path contour remains in place even if in later processing operations the former workpiece contour is removed by further treatment to the workpiece. Thus, the finished representation includes not only the contours of the finished workpiece, but also a large number of lines which were all tool path contours at one time during the processing operation. This complexity can very rapidly give rise to representation which is difficult to use.

Furthermore, at the Paris Exhibition "EMO 1983," a control system was disclosed which is described in a brochure of the company MAHO, D-8962, Pfronten. In this control system a workpiece that is being processed with a milling tool is shown in three projections. In order to make it possible to perceive what depth a processing operation has reached, another projection must be viewed, which, does not show all of the contours, but is a presentation of exclusively a respective silhouette. The viewer therefore, has no spatially acting impression of the workpiece image, and various processing planes can be determined visually only by inspecting all three projections. Thus, known types of workpiece representation methods are either not entirely satisfactory, or alternatively are too expensive (as for example the three dimensional representations accomplished with the aid of computer aided design).

SUMMARY OF THE INVENTION

The present invention is directed to an improved process for representing three dimensional structures, which improves spatial representation and which allows changes in the structure to be represented in a manner which is feasible with substantially smaller computer expenditure than is required for example in computer aided design.

According to this invention, a three-dimensional surface comprising a plurality of viewing planes is represented by assigning a respective graphic pattern to each of the viewing planes. These graphic patterns are ordered in a hierarchy such that a hierarchically higher pattern overrides a hierarchically lower pattern, and deeper ones of the viewing planes in the surface are represented by patterns which are correspondingly higher in the hierarchy. Changes in the surface at a selected viewing plane are represented by a moving zone of the graphic pattern corresponding to the selected viewing plane such that the graphic patterns corresponding to higher lying viewing planes are written over by the movable tool image but graphic patterns corresponding to viewing planes no higher than the selected viewing plane remain unaffected.

A particular advantage of the method of this invention is that a good three-dimensional representation of the process workpiece is provided, so that during the programming operation the appearance of the workpiece to be manufactured can be judged. Computer requirements remain within limits, so that the method of this invention can be implemented by microprocessors, such as those which are typically used in numerical machine tool control programming systems.

The invention itself, together with further objects and attendant advantages, will best be understood by reference of the following detailed description, taken in conjunction with the accompanying drawings.

DETAILED DESCRIPTION OF THE PRESENTLY PREFERRED EMBODIMENTS

Turning now to the drawings, the preferred embodiments of this invention will now be described. As a preliminary matter it should be noted that the drawings have been severely simplified and rendered in a schematic manner as to many details. This has been done because the relationship between the graphic representations is difficult to illustrate.

Figure 1:
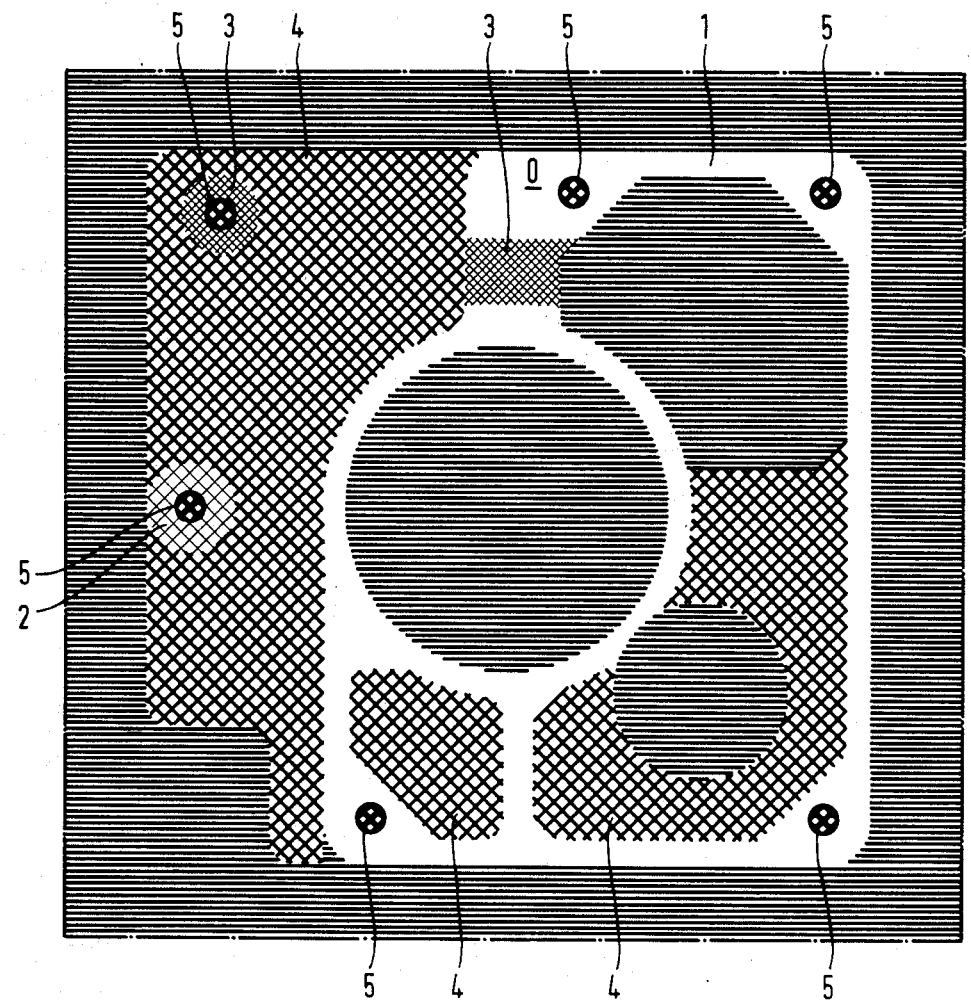
FIG. 1 is a representation in accordance with the preferred embodiment of this invention of a fully processed workpiece.

In FIG. 1, a workpiece awaiting processing is represented as a white silhouette on a black background. In FIG. 1, a workpiece 0 is represented which includes inside and outside processed contours. These contours have been created by milling operations, and are recessed in depth perpendicularly to the plane of the drawing. The various recesses correspond to the processing planes at which the milling tool has removed material. The processing planes can be thought of as arranged in a hierarchy in which the deepest processing plane (as measured from the original surface of the workpiece) is hierarchically the highest stage.

According to the method of this invention, the workpiece is graphically represented in two dimensions, and each processing plane is simulated by a respective viewing plane. The viewing planes are hierarchically ordered, i.e., one viewing plane symbolizes a processing plane which lies higher in a direction perpendicular to the drawing plane than the next, and so forth. A respective graphic pattern is allocated to each of the viewing planes, and these graphic patterns are as a group also hierarchically ordered. In this embodiment, the graphic patterns differ in the density of shading in correspondence with their hierarchic order. FIGS. 2 through 5 illustrate this feature of this embodiment in greater detail.

Figure 2:
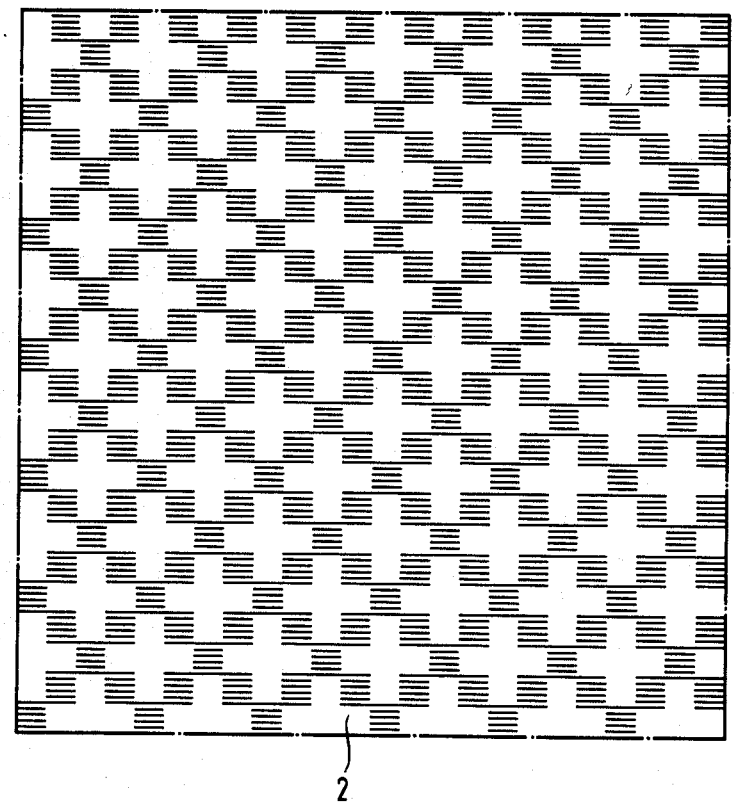
FIG. 2 is a greatly enlarged portion of a graphic pattern used in the embodiment of FIG. 1 that represents the highest processing plane.

FIG. 2 shows a highly enlarged representation of the graphic pattern of the lowest hierarchic stage, which represents the viewing or processing plane of the least depth below the original surface of the workpiece. In the graphic pattern 2 of FIG. 2 the proportion of blackened elements is lowest. This pattern can not influence any of the hierarchically higher standing patterns, as will be described in detail below.

Figure 3:
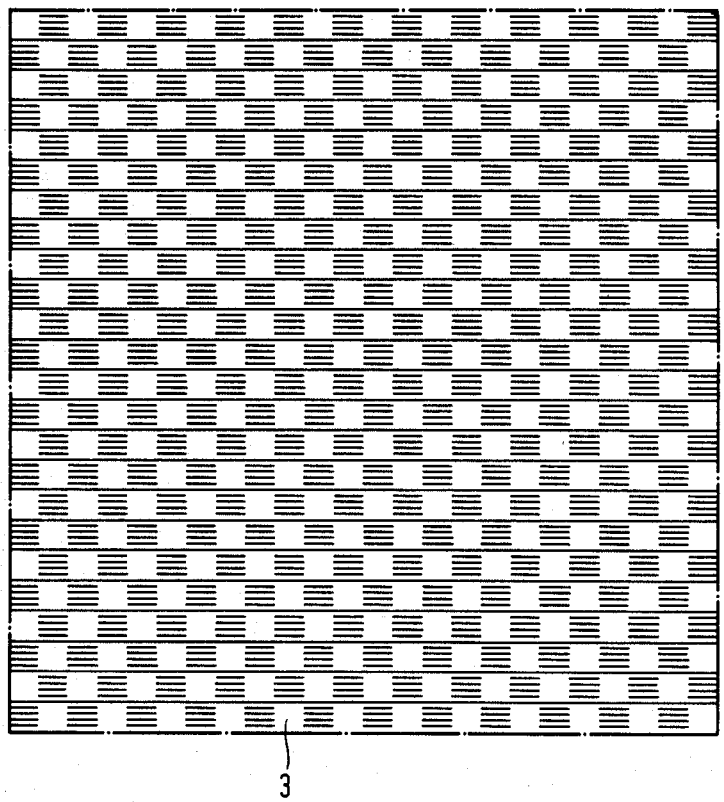
FIG. 3 is a view corresponding to that of FIG. 2 of a graphic pattern that represents a next deeper processing plane.

FIG. 3 represents the graphic pattern of the next higher hierarchic stage, greatly enlarged. The graphic pattern 3 of FIG. 3 includes a proportion of blackened elements that is considerably higher than the graphic pattern 2 of FIG. 2. In the workpiece representation, the graphic pattern 3 represents the next viewing or processing plane that lies lower than the plane represented by the graphic pattern 2 of FIG. 2.

Figure 4:
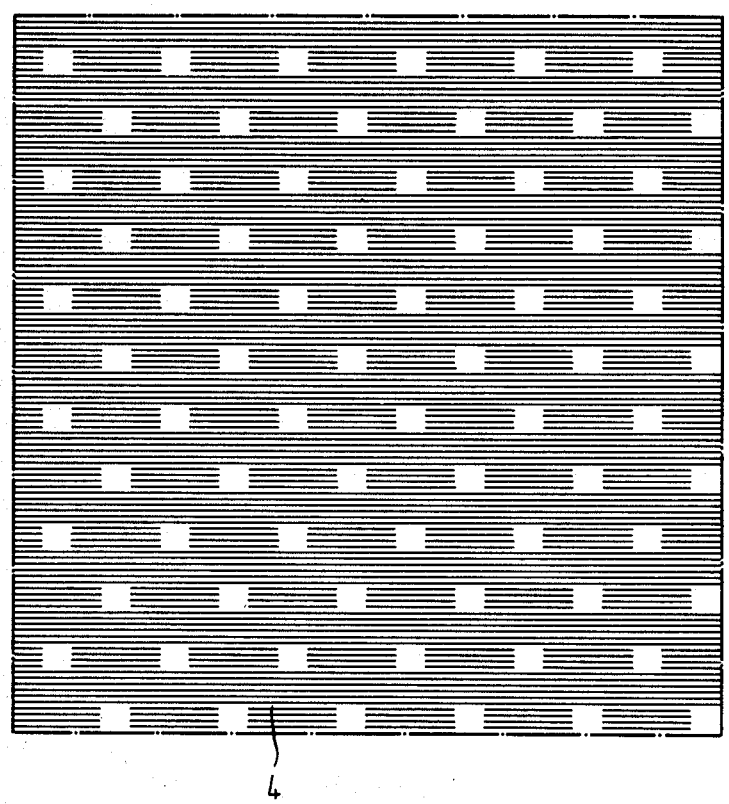
FIG. 4 is a view corresponding to that of FIG. 2 of a graphic pattern that represents a still deeper processing plane.

A still lower viewing or processing plane is represented by the graphic pattern 4 shown in FIG. 4, greatly enlarged. Here, the constituent of blackened elements is already considerable. The surface regions of the workpiece 0 in FIG. 1 provided with this graphic pattern 4 are at the third viewing or processing plane on the workpiece 0 represented.

Figure 5:
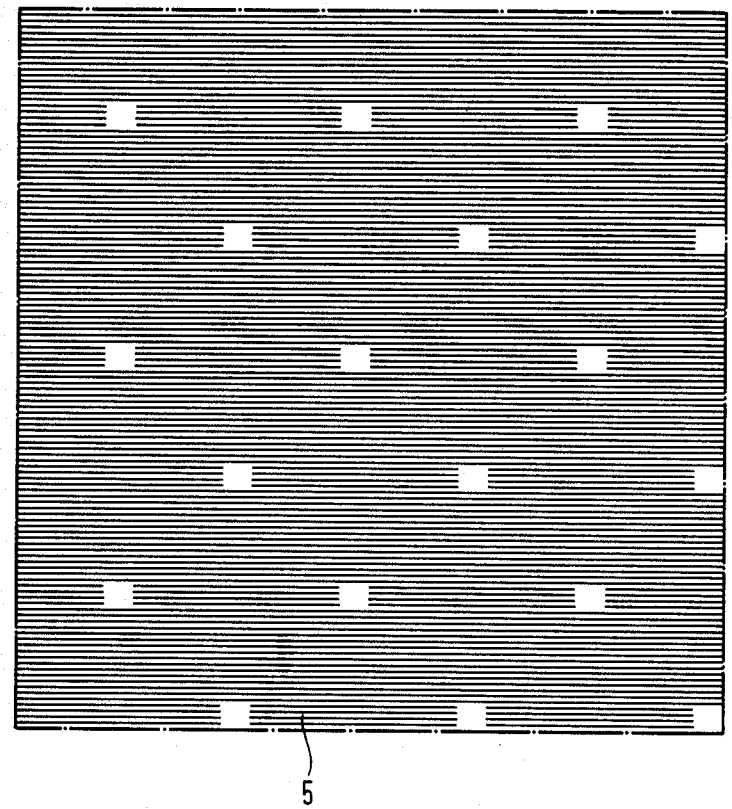
FIG. 5 is a view corresponding to FIG. 2 of a graphic pattern that represents a very deep processing plane.

A fourth viewing or processing plane is represented by an enlarged pattern 5 as shown in FIG. 5. Here, virtually all of the image constituents are covered by blackened elements.

Figure 6:
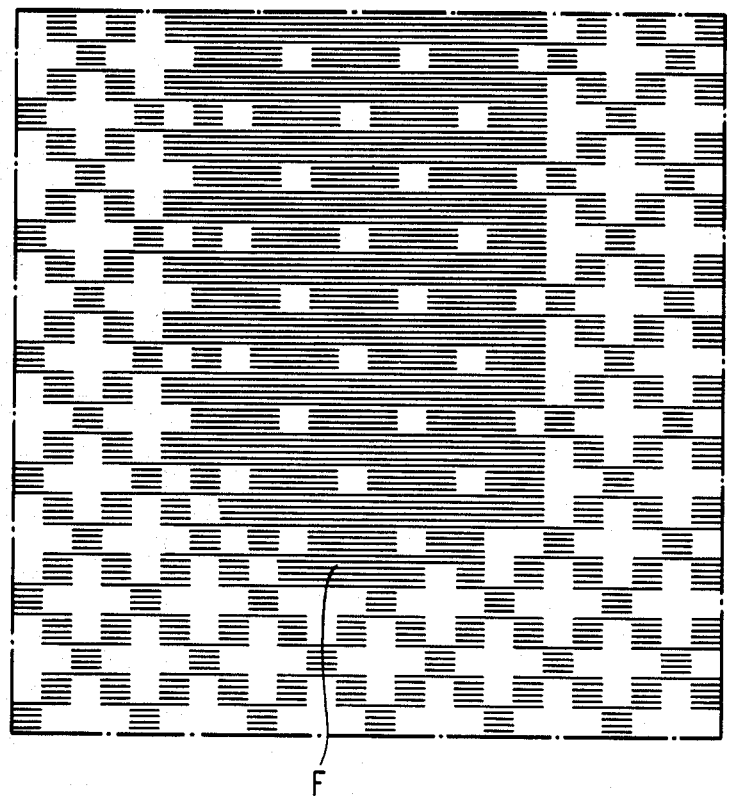
FIG. 6 is a view corresponding to that of FIG. 2 that represents a processing plane into which a groove is being milled by a milling tool.

The process steps that lead to the representation of the workpiece 0 shown in FIG. 1 can now be explained with the aid of FIG. 6. In FIGS. 1 and 6, selected ones of the graphic patterns of FIGS. 2-5 are included. The viewing and/or processing planes 2-5, which are differently shaded in FIGS. 2-5, are numbered with the digits of FIGS. 2-5. The individual shadings symbolize the graphic patterns of FIGS. 2-5 allocated to particular viewing or processing planes 2-5.

In FIG. 6, a workpiece 0 presents a surface that is defined as the viewing or processing plane 2. The corresponding shading is represented therefore, in FIG. 2. The processing of the workpiece 0 occurs by means of a milling tool F, which is simulated by a movable circle. This circle is caused to move in correspondence with the programmed tool path over or into the workpiece 0. When the actual milling tool F comes into engagement with the workpiece 0, material is removed, and the path left by the milling tool F defines on the workpiece 0 another viewing or processing plane 4 which is recessed with respect to the original processing plane 2. In the simulation on the picture screen, the disc representing the milling tool F is filled out with the graphic pattern of this further, recessed viewing plane 4. Programmed movement of the milling tool causes the disk F, containing the graphic pattern of the new plane 4, to move and "etch" out the pattern on the first plane 2 during tool movement. This is possible, since the graphic pattern of the plane 4 is hierarchically higher than the pattern of the plane 2. In the simulation, the graphic pattern represented in the zone becomes darker, since the proportion of blackened elements is higher in pattern 4 as contrasted with pattern 2. This simulated process corresponds to the reality, for only when the tool penetrates into the workpiece 0 on a lower plane is material removed and the previously generated processing plane or workpiece contour is removed as well. The previously generated contours are therefore written over. And thus, the previously generated contours which are not evident in the finished workpiece do not later disturb the overall impressions of the viewer as in the state of the art systems described in the opening paragraphs of this application.

Note that the patterns 2, 4 of FIG. 6 are spatially synchronized. That is, each lighter element of pattern 4 corresponds to a respective lighter element in the pre-existing pattern 2. For this reason, the action of the tool F can be simulated merely by adding blackened elements, without disturbing or moving any of the remaining ones of the lighter elements.

The tool path of the circular disk simulating the milling tool F now "etches" (or erases) in this viewing or processing plane all of the parts of the workpiece 0 in which the milling is deeper than the previously generated processing planes. Equally high or lower-lying workpiece contours are not altered, which again corresponds to the reality.

The graphic representations correspond to reality in the simulation of workpiece processing because the hierarchic ordering of the graphic patterns corresponds to the analysis of the workpiece 0 in terms of viewing planes arranged in a hierarchy that corresponds to the hierarchy of the graphic patterns.

In an equivalent manner in a further processing operation which relates to a lower viewing or processing plane, the circular disk F provided with the hierarchically higher graphic pattern would erase the hierarchically lower graphic patterns.

This etching or erasing proceeds, if need be, so far that parts of the workpiece (in which the material is completely removed) appear completely blackened. Of course, no tool contour at all remains in such a completely blackened region.

In this manner, there arises a two-dimensional representation with depth effect of a three-dimensional structure.

The hierarchic order of the graphic patterns can be established also according to the well-known rules of the subtractive color theory (see e.g. *Meyers Lexikon der Technik und der exakten Naturwissenschaften*, edition of 1970, second volume, pages 869 and following). According to these rules in the first phase of the representation the workpiece appears as a white silhouette. In the first processing the milling tool "etches" in the "blue plane", so that in these parts yellow appears. In the next lower plane "etching" is done in the "blue and green plane", so that then red appears. In the still deeper-lying next plane "etching" is done in the "blue, green and red planes" and black appears.

Of course, the hierarchic ordering of the graphic patterns can also be established by a combination of colors and hatchings, which further improves the versatility of the process.

Also of importance is the variety of manners with which the establishment of the viewing planes can occur. It is possible to lay out in the workpiece a number of equidistant viewing planes, the spacing therebetween being governed according to the resolution of the graphic patterns.

Alternatively, in knowledge of technical workpiece drafting, the viewing planes can be laid out in the workpiece in planes in which there actually occurs a recessing in depth.

The most advantageous method for many applications is automatically to establish the viewing planes by the actual final processing planes of the particular workpiece being depicted. In the event several milling operations at any one programmable contour are required in several planes, preferably only the last milling operation on the contour triggers the establishing of the viewing plane. Several milling operations of a single contour are frequently needed, for example, when the depth between two adjacent processing planes is so great that the milling tool cannot remove sufficient material in a single feed to reach the next lower plane. In order to avoid the situation that in each feed a viewing plane is used up, only the last processing cycle in the final processing plane should be allowed to trigger the establishment of a viewing plane.

Of course, it should be understood that a wide range of changes and modifications can be made to the preferred embodiments described above. For example, the process of this invention is not limited to representation of milling operations, but can also be carried out in conjunction with other processing operations. It is therefore intended that the foregoing detailed description be regarded as illustrative rather than limiting, and that it be understood that it is the following claims, including all equivalents, which are intended to define the scope of this invention.

We claim:

1. A method for controlling a device to represent in a single two-dimensional projection the surface of a three-dimensional object comprising a plurality of viewing planes, each viewing plane representing a depth level of the surface, the viewing planes spaced from one another along a pre-selected viewing direction, the method comprising the following steps:
   assigning a unique graphic pattern to each viewing plane, the graphic patterns assigned in a hierarchy, the deeper planes being assigned a higher order in the hierarchy such that hierarchically higher orders of graphic patterns will be represented with priority over hierarchically lower orders of graphic patterns;
   representing the surface with the graphic pattern corresponding to each existing depth level of the surface; and
   representing changes in the surface at a selected depth by using a movable tool image, the movable tool image being assigned the same graphic pattern as the viewing plane corresponding to the selected depth, the representation such that graphic patterns corresponding to higher lying depths are written over by the movable tool image but graphic patterns corresponding to depths no higher than the viewing plane remain unaffected.

2. The method of claim 1 wherein the steps of representing the surface and representing the changes in the surface are performed in several projections.

3. The method of claim 2 wherein the several projections comprise three orthonogal projections.

4. The method of claim 1 wherein each graphic pattern presents a shading of density proportional to the order of the respective graphic pattern in the hierarchy.

5. The method of claim 1 wherein said hierarchically ordered graphic patterns comprise colors of differing hues.

6. The method of claim 1 wherein said hierarchically ordered graphic patterns differ from one another both with regard to density of shading and color.

7. The method of claim 1 wherein the spacing along the viewing direction represented by each viewing plane is a constant pre-selected value.

8. The method of claim 1 wherein each of the viewing planes represents a respective simulated processing plane generated by a simulated material removing tool.

9. The method of claim 1 wherein the viewing planes are established according to geometric expediency in knowledge of technical workpiece drafting.

10. The method of claim 8 wherein the viewing planes are automatically established by respective proposed processing planes corresponding to proposed processing of a workpiece, and wherein only the last proposed processing plane establishes the viewing plane in the event multiple processing of the same workpiece contour in several proposed processing planes is required.

11. The method of claim 1 wherein action of a material removing tool is simulated by the movable tool image, and wherein the movable tool image has a shape corresponding to a silhouette of the tool and is provided with the graphic pattern corresponding to the selected viewing plane.

12. A method for controlling a device to represent in a single two-dimensional projection the surface of a three-dimensional object comprising a plurality of viewing planes, each viewing plane representing a depth level of the surface, the viewing planes spaced from one another along a pre-selected viewing direction, the method comprising the following steps:
   representing the surface by assigning a unique graphic pattern to selected portions of each viewing plane, said graphic patterns assigned in a hierarchy, the deeper planes being assigned a higher order in the hierarchy such that deeper ones of said viewing planes along the viewing direction will be represented with priority over hierarchically lower orders of graphic patterns;
   representing the surface with the graphic pattern corresponding to each existing depth level of the surface; and
   representing changes in the surface at a selected depth by using a movable cursor, the cursor assigned the graphic pattern corresponding to the selected viewing plane such that graphic patterns corresponding to higher lying depths are written over by the cursor but graphic patterns corresponding to depths no higher than the selected viewing plane remain unaffected.

13. The method of claim 12 wherein the hierarchically ordered graphic patterns comprise synchronized shadings of differing density.

14. The method of claim 12 wherein the hierarchically ordered graphic patterns differ from one another in regard to at least one of (1) density of shading; (2) color; and (3) intensity.

15. The method of claim 12 wherein the cursor represents a movable tool image and has a shape corresponding to a silhouette of a selected tool.

16. The method of claim 12 wherein the viewing planes are automatically established by processing planes corresponding to proposed processing of a workpiece, and wherein only the last processing plane establishes the viewing plane in the event multiple processing of the same workpiece contour in several processing planes is required.

* * * * *

UNITED STATES PATENT AND TRADEMARK OFFICE
CERTIFICATE OF CORRECTION

PATENT NO. : 4,714,920

DATED : December 22, 1987

INVENTOR(S) : Dieterich Andernach et al.

It is certified that error appears in the above-identified patent and that said Letters Patent is hereby corrected as shown below: On The Title Page:

IN THE REFERENCES CITED
U.S. PATENT DOCUMENTS

Please add the following:

| | | |
|---|---|---|
| 4,222,048 | 9/1980 | Johnson |
| 4,352,105 | 9/1982 | Harney |
| 4,490,781 | 12/1984 | Kishi et al. |
| 4,509,043 | 4/1985 | Mossaides |
| 4,521,860 | 6/1985 | Kanematsu et al. |
| 4,530,046 | 7/1985 | Munekata et al. |
| 4,556,833 | 12/1985 | Kishi et al. |
| 4,558,438 | 12/1985 | Jones et al. |

IN A SECTION TO BE ENTITLED
"FOREIGN PATENT DOCUMENTS"

Please add the following:

| | | |
|---|---|---|
| 0124615 | 11/1984 | European |
| DE3234426 | 3/1983 | West Germany |
| 0083836 | 7/1983 | European |

Signed and Sealed this

Twenty-second Day of November, 1988

Attest:

DONALD J. QUIGG

Attesting Officer

Commissioner of Patents and Trademarks